(12) United States Patent
Harney et al.

(10) Patent No.: US 7,628,446 B2
(45) Date of Patent: Dec. 8, 2009

(54) VEHICULAR REAR CARGO MODULE

(75) Inventors: William J. Harney, Farmington Hills, MI (US); Pierre-Xavier Roy, Toronto (CA)

(73) Assignee: Intier Automotive Inc., Newmarket, Ontario (CA)

( * ) Notice: Subject to any disclaimer, the term of this patent is extended or adjusted under 35 U.S.C. 154(b) by 32 days.

(21) Appl. No.: 10/556,180

(22) PCT Filed: May 17, 2004

(86) PCT No.: PCT/US2004/015667

§ 371 (c)(1),
(2), (4) Date: Jan. 25, 2007

(87) PCT Pub. No.: WO2004/103803

PCT Pub. Date: Dec. 2, 2004

(65) Prior Publication Data

US 2007/0138836 A1    Jun. 21, 2007

(51) Int. Cl.
*B62D 25/10* (2006.01)
*B62D 21/03* (2006.01)

(52) U.S. Cl. .............. 296/203.04; 296/193.02; 296/193.08; 296/76

(58) Field of Classification Search ............ 296/203.04, 296/76, 187.11, 191, 193.02, 193.08, 193.04, 296/24.44, 29
See application file for complete search history.

(56) References Cited

U.S. PATENT DOCUMENTS

| | | | |
|---|---|---|---|
| 3,590,936 A | 7/1971 | Wessells, III | |
| 4,634,174 A * | 1/1987 | Kamiya | .................. 296/24.44 |
| 4,950,025 A | 8/1990 | Yoshii | |
| 5,102,186 A | 4/1992 | Yoshii et al. | |
| 5,123,696 A * | 6/1992 | Watari | ................... 296/203.04 |
| 5,171,054 A | 12/1992 | Wilson | |
| 5,350,214 A * | 9/1994 | Yamauchi et al. | ........... 296/204 |
| 5,580,121 A | 12/1996 | Dange et al. | |
| 5,754,664 A * | 5/1998 | Clark et al. | ................... 381/86 |
| 5,881,458 A | 3/1999 | Wolf et al. | |
| 6,010,181 A | 1/2000 | Robbins et al. | |
| 6,088,918 A | 7/2000 | Corporon et al. | |
| 6,113,180 A * | 9/2000 | Corporon et al. | ....... 296/203.04 |
| 6,183,030 B1 | 2/2001 | Stender et al. | |
| 6,241,309 B1 * | 6/2001 | Roehl et al. | ............ 296/203.04 |

(Continued)

FOREIGN PATENT DOCUMENTS

FR    0 380 891    12/1989

(Continued)

*Primary Examiner*—Glenn Dayoan
*Assistant Examiner*—Gregory Blankenship
(74) *Attorney, Agent, or Firm*—Clark Hill PLC

(57) ABSTRACT

A rear frame assembly is provided for use in an automotive vehicle extending between upright side walls to define a trunk opening. The rear frame assembly includes a cross car beam extending laterally between the side walls of the vehicle. A sail panel is fixedly secured to the cross car beam. The sail panel includes symmetrically opposite flanges adapted to conform to the side walls of the vehicle to define a path for diverting a flow of water around the trunk opening. The sail panel includes a conically shaped concavity for engaging a conical protrusion on the vehicle for locating the rear frame assembly within the vehicle during installation of the rear frame assembly to the vehicle.

9 Claims, 4 Drawing Sheets

U.S. PATENT DOCUMENTS

| | | | |
|---|---|---|---|
| 6,377,695 B1 * | 4/2002 | Azima et al. | 381/152 |
| 6,443,518 B1 * | 9/2002 | Rohl et al. | 296/203.01 |
| 6,808,228 B1 * | 10/2004 | Campbell et al. | 296/193.02 |
| 6,983,971 B2 * | 1/2006 | Broadhead et al. | 296/24.44 |
| 7,083,225 B2 * | 8/2006 | Yakata et al. | 296/203.04 |
| 2003/0102696 A1 | 6/2003 | Matsuoka | |

FOREIGN PATENT DOCUMENTS

| | | |
|---|---|---|
| JP | 2000-177641 | 12/1998 |
| WO | PCT/CA02/00418 | 3/2002 |

* cited by examiner

VEHICULAR REAR CARGO MODULE

BACKGROUND OF THE INVENTION

1. Field of the Invention

The invention relates to a frame assembly in an automotive vehicle body. More particularly, the invention relates to a rear cargo module connected to the frame assembly and is pre-assembled prior to installation on the vehicle body.

2. Description of the Related Art

Automotive vehicles include a rigid body structure. Typically, the body structure comprises a plurality of pre-formed structural members that are welded together. The structural members provide increased stiffness and rigidity to the rear of the rigid body structure. Typically, the body structure, including the structural members is completed prior to the installation of other components, such as a rear package shelf, audio speakers, seat assemblies, etc. Therefore, current manufacturing techniques involve several steps and operations to complete installation of all the desired components of the rigid body structure.

There is therefore a need in the art to simplify and reduce the cost of manufacture of the vehicle. Such simplification includes minimizing the number of members or components in the body structure as well as, reducing the number of steps in the manufacture of the body structure. Also, there is the desire to reduce the overall weight of a vehicle while maintaining the desired performance characteristics.

SUMMARY OF THE INVENTION

According to one aspect of the invention, a rear frame assembly is provided for use in an automotive vehicle extending between upright side walls to define a trunk opening. The rear frame assembly includes a cross car beam extending laterally between the side walls of the vehicle. A sail panel is fixedly secured to the cross car beam. The sail panel includes symmetrically opposite flanges adapted to conform to the side walls of the vehicle to define a path for diverting a flow of water around the trunk opening.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
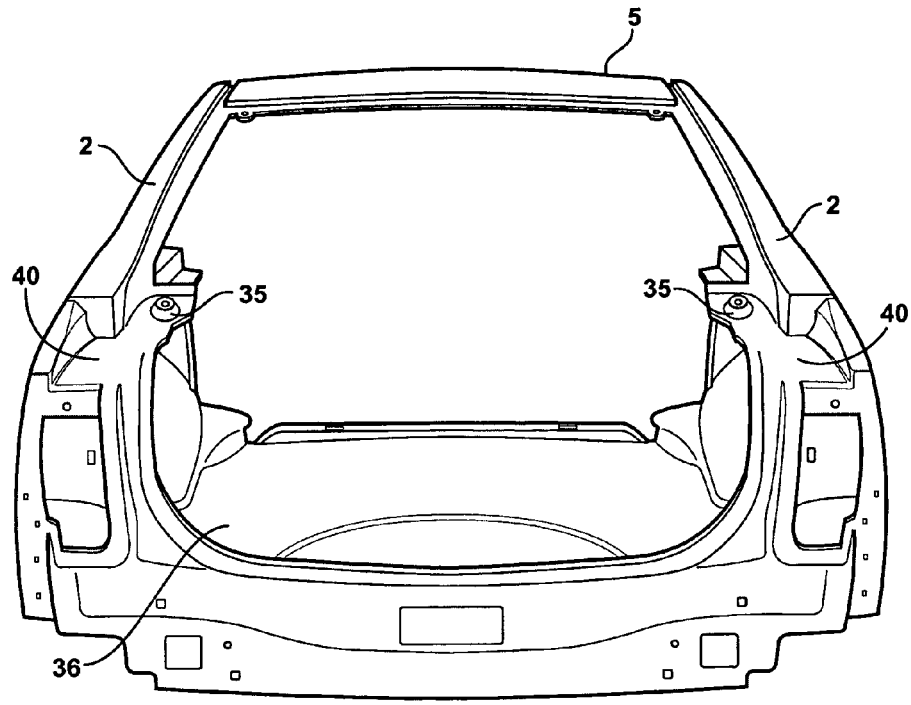
FIG. 1 is a rear view of an automotive vehicle body.

Referring to FIGS. 1 through 5, there is shown a rear frame assembly 10 extending between side walls 2 of an automotive vehicle 5. The rear frame assembly 10 includes a generally tubular, U-shaped cross car beam 12. The cross car beam 12 includes a generally horizontal cross member 14 extending between spaced apart upright members 16. Each upright member 16 extends between the horizontal cross member 14 and a distal end 18. Brackets 20 are formed in the cross member 14 for fixedly securing a seat back panel or frame (not shown) with suitable attachment means, such as bolts, clips, or welding. Preferably, the cross car beam 12 is hydroformed, but may be formed by or in conjunction with other suitable metal forming methods, such as bending or welding. The cross car beam 12 properties may be varied to provide the flexibility to tune vehicle dynamics to an individual vehicle's specifications. Mounting plates 22 are fixedly secured to the distal ends 18 of the upright members 16. Each mounting plate 22 includes apertures 23 for attaching the cross car beam 12 to the vehicle 5 with bolts or the like. The cross car beam 12 manages the cross car loads in the vehicle 5 and provides sheer flow through the structure of the vehicle.

Figure 2:
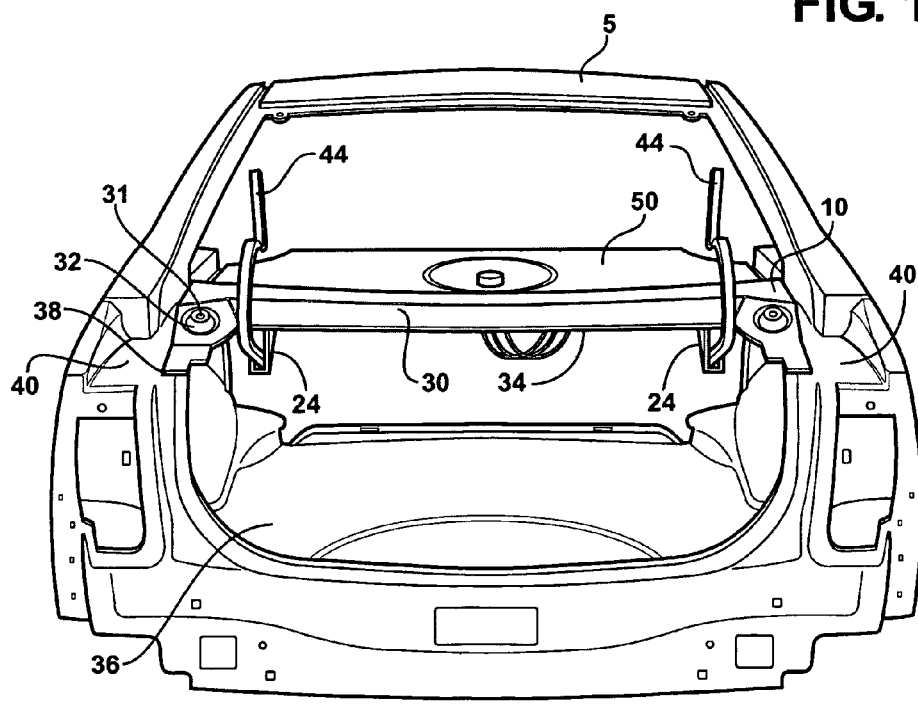
FIG. 2 is a rear view of the vehicle body with a rear frame assembly installed.
Figure 3:
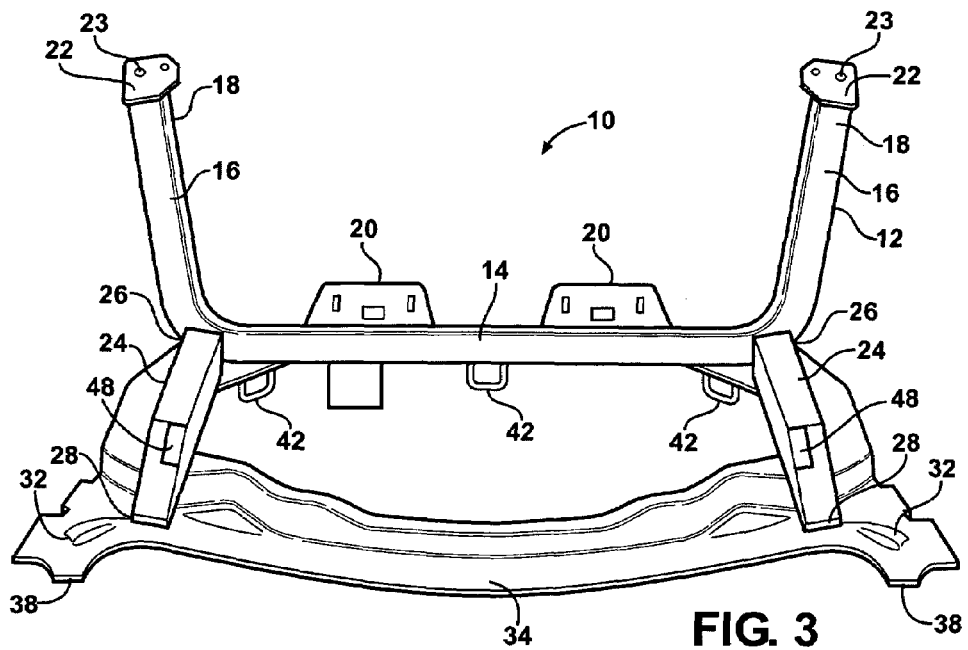
FIG. 3 is a bottom view of the rear frame assembly.
Figure 4:
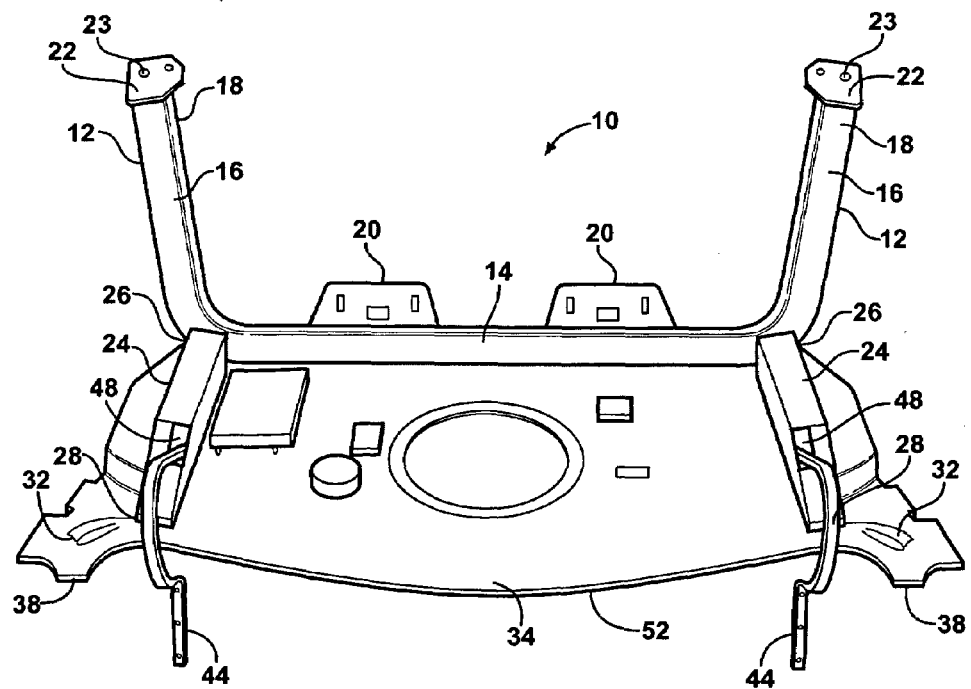
FIG. 4 is a bottom view of the rear frame assembly with a molded shelf installed to the rear frame assembly.

A plurality of tie bars 24 extend generally rearwardly in the vehicle 5, as best shown in FIG. 2. Each of the plurality of tie bars 24 extends between a front end 26 fixedly secured to the cross member 14 and an opposite rear end 28. A sail panel 30 is fixedly secured to the rear end 28 of each of the plurality of tie bars 24. At least one concavity 32 is formed in the sail panel 30. Preferably, the concavity 32 is conically shaped for receiving therein a corresponding cone structure 35 protruding from the vehicle 5. An aperture 31 is formed in the center of the concavity 32 for receiving a bolt 33 therethrough during installation of the rear frame assembly 10 to the vehicle 5. The concavity 32 assists in the installation and proper alignment of the assembly 10 into the vehicle via mating engagement with the cone structures 35. Additionally, the mating conical surface contact between the concavity 32 and cone structure 35 spreads the load around a larger geometry compared to planar mating surfaces. In a preferred aspect of the present invention, the concavity 32 and cone structures 35 are bonded to each other using an adhesive sealant in conjunction with the bolt 33, described above. The adhesive sealant provides a water barrier to direct the flow of water away from a trunk opening 36.

The sail panel 30 includes a rear edge 34 extending between the side walls 2 of the vehicle 5. The rear edge 34 and the side walls 2 of the vehicle 5 generally define a trunk opening 36 in the vehicle 5. The sail panel 30 includes symmetrically opposite flanged edges 38 each fixedly secured to a channel section 40 formed in each side wall 2 of the vehicle 5 by welding, bolting or the like. Each channel section 40 has a generally S-shaped cross section. The flanged edges 38 are adapted to follow the S-shaped cross section of the channel sections 40. The flanged edges 38 and the respective channel sections 40 define a path for diverting a flow of water around the trunk opening 36.

A plurality of anchors 42 are fixedly secured to the cross member 14. Each of the plurality of anchors 42 extends outwardly from the cross member 14 to allow the attachment of a child seat tether, as known by those skilled in the art.

A trunk lid support arm 44 is hingedly coupled to each of the plurality of tie bars 24. The trunk lid support arms 44 are fixedly secured to a trunk lid (not shown) for supporting the trunk lid during movement between opened and closed positions with respect to the trunk opening 36. At least one assist spring (not shown) preferably extends between one of the trunk lid support arms 44 and the rear frame assembly 10 for assisting movement of the trunk lid between the opened and closed positions. Cutouts 48 are formed in each of the plurality of tie bars 24 for accommodating the movement of the trunk lid support arms 44 during movement of the trunk lid between the opened and closed positions.

A shelf 50 is fixedly secured to the rear frame assembly 10 by bolts or the like. The shelf 50 extends between the cross member 14 and the rear edge 34 of the sail panel 30. Preferably the shelf 50 comprises a plastic member formed using conventional molding techniques. The shelf 50 can be adapted to support a variety of components, such as audio speakers, control modules and wiring harnesses. In a preferred aspect, a plurality of ribs 52 are formed in the shelf 50 to provide structural rigidity to the shelf 50 and the rear frame assembly 10.

Figure 5:
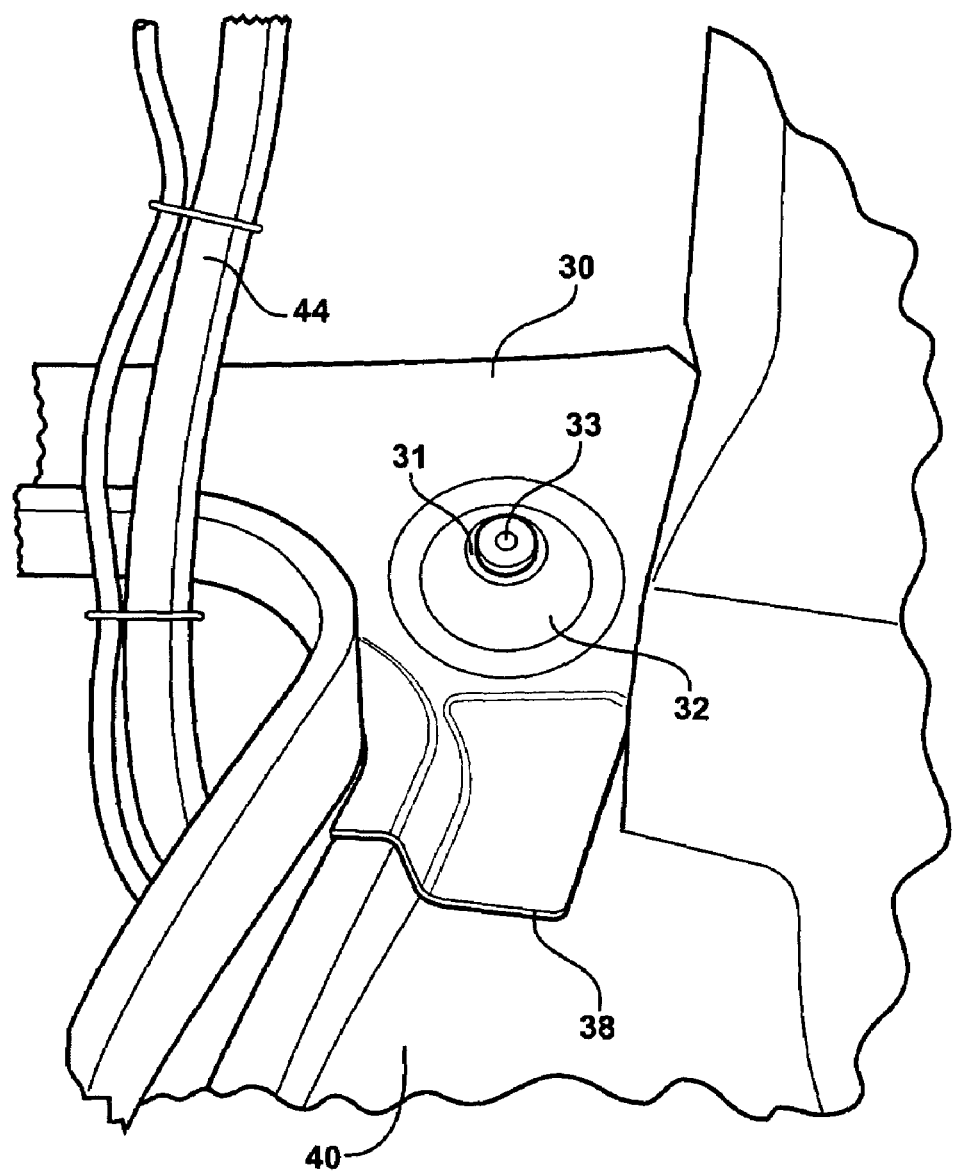
FIG. 5 is an enlarged perspective view of a portion of a sail panel in the rear frame assembly.
Figure 6:
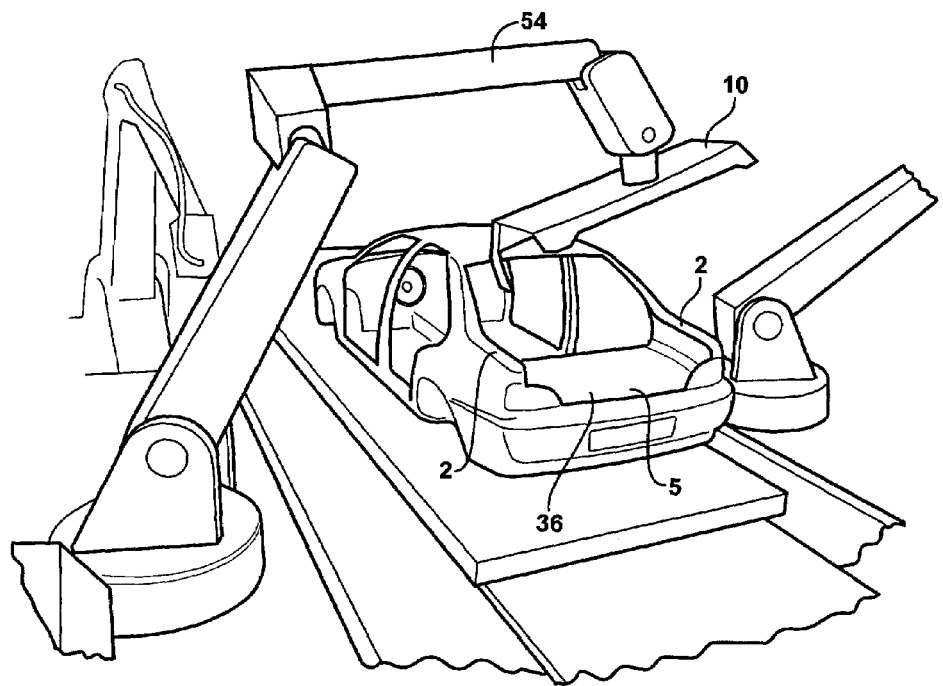
FIG. 6 is a perspective view of an assembly line, in which the rear frame assembly is being lifted into the vehicle.
Figure 7:
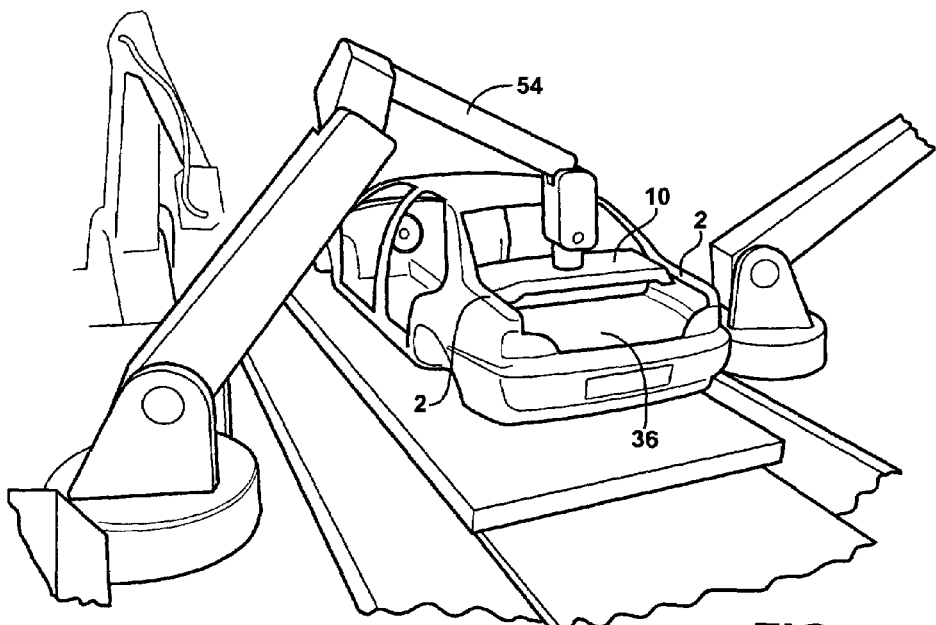
FIG. 7 is a perspective view of the assembly line, in which the rear frame assembly has been placed into the vehicle.

Referring to FIGS. 5, 6 and 7, the rear frame assembly 10 can be lifted and installed into the vehicle 5 utilizing a robotic arm 54 on an assembly line. Preferably, the shelf 50 and other components, such as audio speakers and wiring harnesses are preinstalled onto the rear frame assembly 10 and installed together into the vehicle 5 as an integrated rear cargo module. During placement of the rear frame assembly 10 into the vehicle, the cone structure 35 on the vehicle 5 is aligned with and extends into the concavity 32 in the sail panel 30 to help properly locate the rear frame assembly 10 with respect to the vehicle 5. After the rear frame assembly 10 has been placed in the vehicle, the bolt 33 is installed through each aperture 31 of the sail panel 30 and into corresponding threaded bores formed in the respective cone structure 35 to secure the sail panel 30 to the vehicle 5. Also, bolts are installed through the apertures 23 in the mounting plates 22 and into corresponding threaded bores in the vehicle 5 to retain the cross car beam 12 to the vehicle 5. Attachment of the rear frame assembly 10 to the vehicle provides additional strength and rigidity to the vehicle. After the rear frame assembly 10 has been secured to the vehicle 5, the trunk lid can be fixedly secured to the trunk lid support arms 44.

The invention has been described in an illustrative manner, and it is to be understood that the terminology that has been used is intended to be in the nature of words of description rather than of limitation.

Many modifications and variations of the present invention are possible in light of the above teachings. It is, therefore, to be understood that within the scope of the appended claims, the invention may be practiced other than as specifically described.

What is claimed is:

1. A rear frame assembly for use in an automotive vehicle extending laterally between upright side walls defining a trunk opening, the rear frame assembly comprising:
   a cross car beam extending laterally between the side walls of the vehicle, said cross car beam including a horizontal cross member extending between spaced apart upright members;
   a sail panel fixedly secured to the cross car beam, the sail panel including symmetrically opposite flanges adapted to conform to the side walls of the vehicle to define a path for diverting a flow of water around the trunk opening;
   a plurality of tie bars having front and rear ends, wherein the front ends are secured to the horizontal cross; and
   a trunk lid support arm coupled to each of the plurality of tie bars for supporting a trunk lid during movement between opened and closed positions relative to the trunk opening.

2. The rear frame assembly of claim 1 including brackets formed on the horizontal cross member for fixedly securing a back seat.

3. The rear frame assembly of claim 1 wherein the upright members extend between a first end fixedly secured to the horizontal cross member and an opposite distal end, and further including mounting plates secured to the distal ends of the upright members for attaching the cross car beam to the vehicle.

4. The rear frame assembly of claim 1 wherein the sail panel is fixedly secured to the rear ends of the plurality of tie bars.

5. The rear frame assembly of claim 1 wherein the cross member includes a plurality of anchors formed thereon for attachment of a child seat tether.

6. The rear frame assembly of claim 1 wherein the tie bars further include cut outs formed therein for accommodating movement of the trunk lid support arms.

7. The rear frame assembly of claim 1 including a shelf extending between the horizontal cross member and the sail panel for supporting additional components.

8. The rear frame assembly of claim 7 wherein the shelf includes a plurality of ribs formed thereon for providing structural rigidity to the shelf.

9. A rear frame assembly for use in an automotive vehicle extending laterally between upright side walls defining a trunk opening, the rear frame assembly comprising:
   a cross car beam extending laterally between the side walls of the vehicle;
   a sail panel fixedly secured to the cross car beam, the sail panel including symmetrically opposite flanges adapted to conform to the side walls of the vehicle to define a path for diverting a flow of water around the trunk opening, wherein the sail panel includes at least one concavity formed therein, the concavity being conically shaped for mating with a corresponding cone structure protruding from the vehicle for properly positioning and aligning the sail panel for attachment to the vehicle and includes an aperture formed in a center of the concavity for receiving a fastener; and
   an adhesive sealant positioned between the concavity and the cone structure for providing a water barrier to direct a flow of water away from the trunk opening.

\* \* \* \* \*